Sept. 20, 1955　　　D. PIETROROIA　　　2,718,431
DUMP TRAILER

Filed Sept. 23, 1952　　　3 Sheets-Sheet 1

INVENTOR.
DOMINIC PIETROROIA
BY
Mellin and Hanscom
ATTORNEYS

Sept. 20, 1955  D. PIETROROIA  2,718,431
DUMP TRAILER
Filed Sept. 23, 1952  3 Sheets-Sheet 2
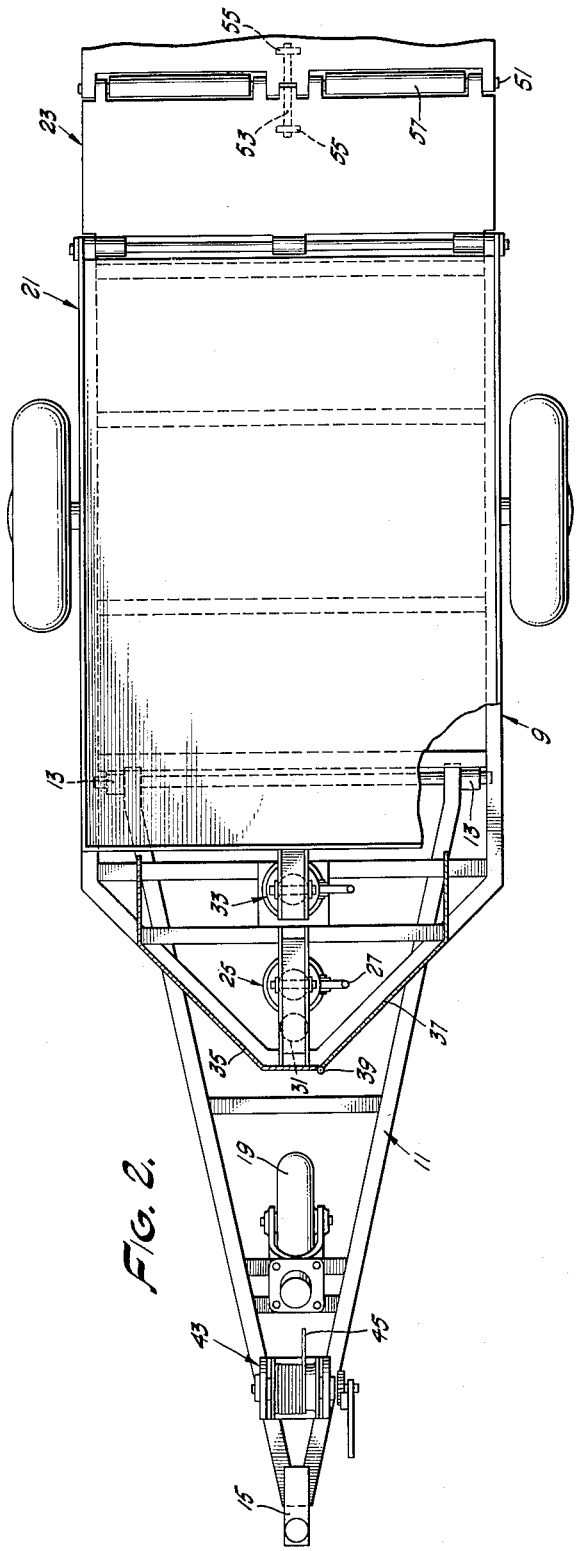
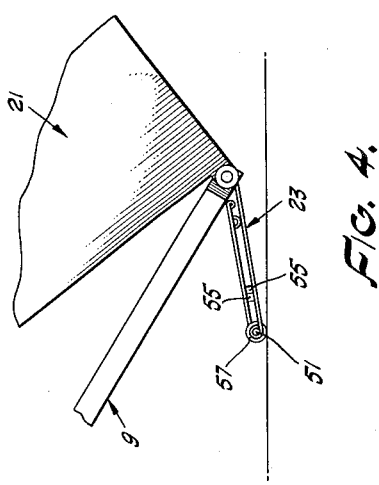
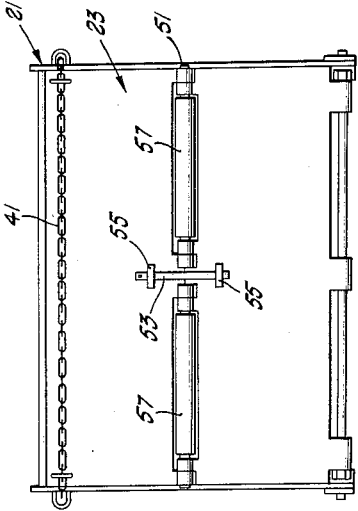
INVENTOR.
DOMINIC PIETROROIA
BY
Mellin and Hanscom
ATTORNEYS Sept. 20, 1955  D. PIETROROIA  2,718,431
DUMP TRAILER Filed Sept. 23, 1952  3 Sheets-Sheet 3

INVENTOR.
DOMINIC PIETROROIA
BY
Mellin and Hanscom
ATTORNEYS

United States Patent Office 2,718,431
Patented Sept. 20, 1955

2,718,431

DUMP TRAILER

Dominic Pietroroia, San Mateo, Calif.

Application September 23, 1952, Serial No. 311,050

4 Claims. (Cl. 298—22)

This invention relates to a dumping and loading vehicle and particularly to a drawn vehicle of such type.

The main object of the present invention is to provide a drawn vehicle so constructed and connected to a drawing vehicle that the angular position of the drawn vehicle may be altered to facilitate dumping the contents of or loading material onto the drawn vehicle.

It is a more particular object of the present invention to provide a two-wheel trailer-type vehicle having extending forwardly therefrom an arm pivotally connected to the vehicle and adapted to be pivotally connected at its forward end to a drawing vehicle, and wherein there is a mechanism for causing pivotal movement between the arm and the trailer to alter the angular position of the trailer frame to facilitate dumping and loading of the vehicle; to provide such a trailer-type vehicle wherein the trailer has a body pivotally mounted on the frame of the trailer to permit the angular movement of the trailer frame relative to the ground to be combined with the angular movement of the body relative to the frame to dispose the body in a steeply inclined position; to provide such a trailer wherein there is a mechanism for positively causing under considerable load a reversal movement from that above described to facilitate lifting an object placed on a lowered tailgate of the trailer.

Various objects of the present invention will be apparent from the following description taken in connection with the accompanying drawings wherein:

Fig. 2 is a plan view of the vehicle disclosed in Fig. 1, showing the same partly broken away for convenience in illustration.

Fig. 3 is a rear end view of the trailer body showing the tailgate in its unfolded condition.

Fig. 4 is a fragmentary side view in elevation, showing the tailgate in its folded condition and the trailer frame and body in inclined positions.

Figure 1:
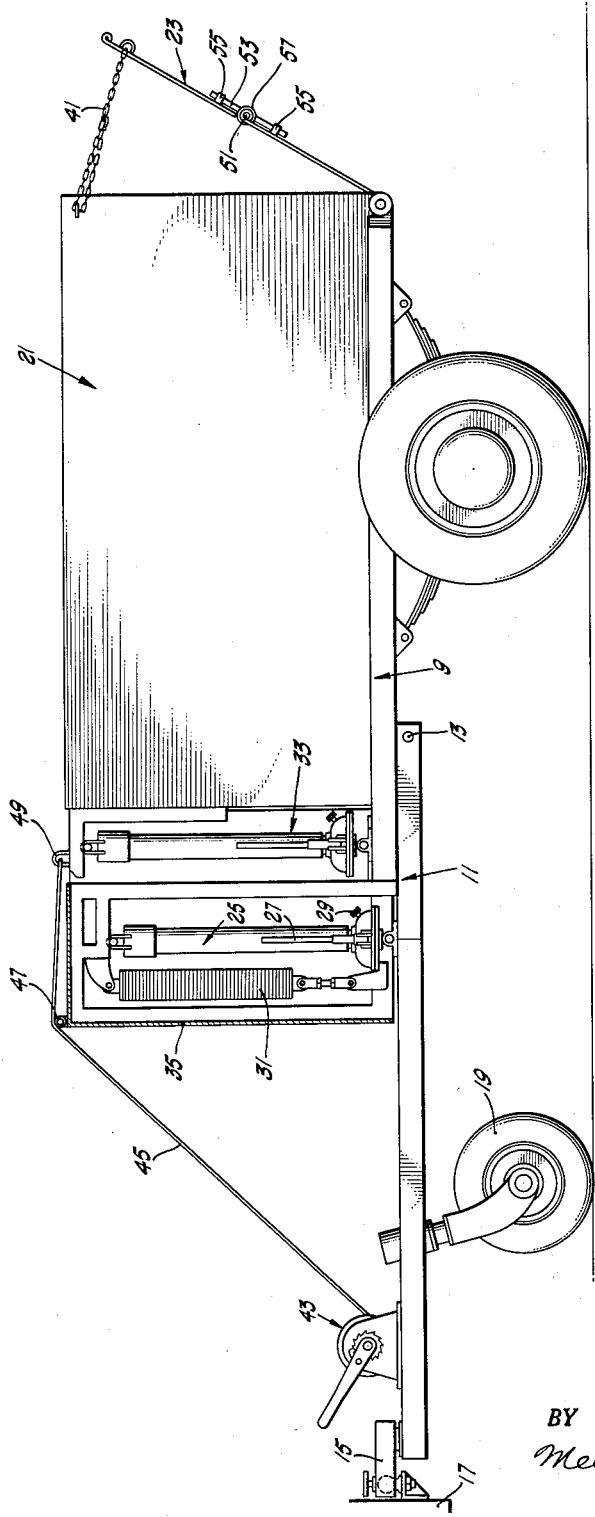
Fig. 1 is a side elevational view of a trailer-type vehicle embodying the concepts of the present invention, the same being partly broken away for convenience in illustration and being disposed in its normal horizontal position.

Referring to the accompanying drawings wherein similar reference characters designate similar parts throughout, Figs. 1 through 4 disclose a construction embodying the concepts of the present invention and including a wheeled trailer frame 9, said frame being of generally a rigid open framework type and having extending therefrom forwardly thereof an arm 11, said arm being also of a rigid open framework construction and being pivoted to the underside of the trailer frame at 13, rearwardly of the forward end of said frame. The overhanging portion of the frame 9 relative to arm 11 limits downward pivotal movement of said frame relative to the arm so as to dispose the two in a horizontal disposition when they are in flush contact. Arm 11 is provided at its forward end with a ball swivel coupling 15 for attachment to a drawn vehicle 17 of any suitable type. Arm 11 is provided with a caster-wheel 19 mounted for bodily pivotal movement about a rearwardly inclined axis.

Pivotally mounted on frame 9 at its rear end is a body 21 having a tailgate 23, of which more will be presently said.

Operatively pivotally connecting arm 11 and frame 9 is a hydraulic actuator 25, preferably of the manually operable type, and having a lever 27 by which, upon pumping movement thereof, relative pivotal movement between arm 11 and frame 9 can be effected. The hydraulic actuator is also provided with a release valve 29 by which the hydraulic actuator can be released. A tension spring 31 connects frame 9 to arm 11 urging the arm and frame into the relationship shown in Fig. 1.

Operatively pivotally connecting body 21 and frame 9 is a second hydraulic actuator 33 of similar construction to actuator 25. Enclosing actuators 25 and 33 is a hood comprising fixed portions 35 (see Fig. 2) and a swingable door 37 pivoted at 39 to fixed portions 35. By swinging the door open, access to the hydraulic actuators is provided.

Figure 5:
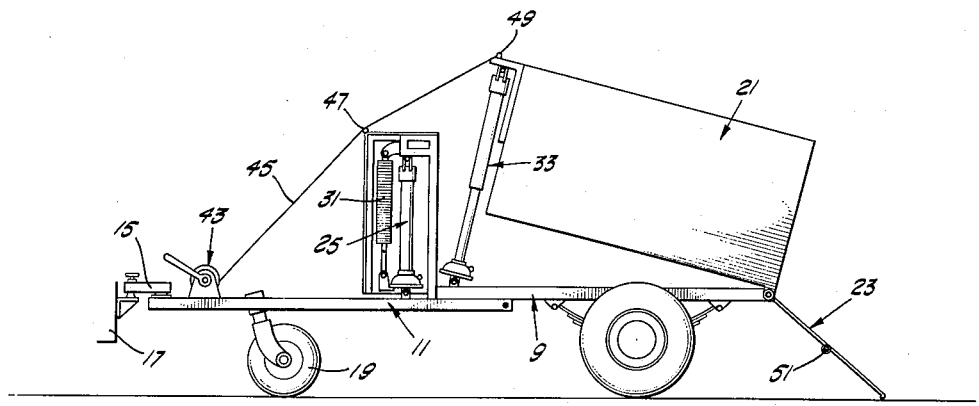
Figs. 5 and 6 show in side elevation various stages of operation of the trailer and its body.

By manual operation, hydraulic actuator 33 can be actuated to pivot body 21 in a counterclockwise direction, as shown in Fig. 5, and, to pivot said body to a more severely inclined position, hydraulic actuator 25 can be manually operated to cause a jackknifing of arm 11 and frame 9, the wheels of the trailer frame rolling forwardly toward the drawing vehicle 17 as the frame is progressively inclined. The contents of the body are effectively dumped with the parts disposed in this position, namely, the position shown in Fig. 6. Upon release of the hydraulic actuators, spring 31 causes a reversal pivotal movement between arm 11 and frame 9 to bring these parts back to their original positions, and during the latter part of such movement the force of gravity causes the body 21 to reversely pivot to move down against the frame.

Figure 6:
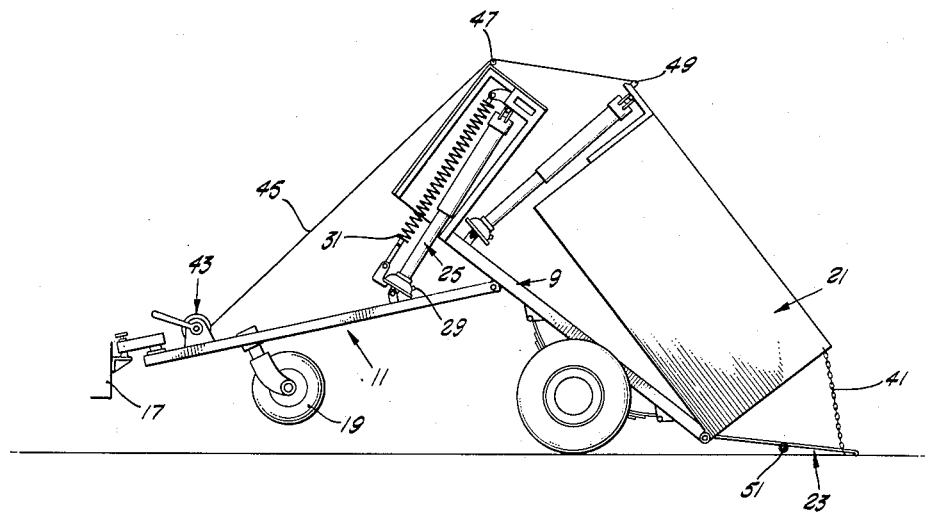

As is apparent from Fig. 1, tailgate 23 is connected to body 21 by chains 41, the chains being of such length that when both hydraulic actuators are fully actuated, as shown in Fig. 6, the tailgate will be disposed approximately parallel and next to the ground to provide a loading platform upon which loads of various types may be placed. It is contemplated that spring 31 will not be sufficiently strong to lift such a load (upon release of actuators 25 and 31), for if it were, when the contents of the body were unloaded in normal use and the hydraulic actuators were released, the trailer parts would snap back together with too great rapidity, and also, such a construction would require too large a spring and too large capacity hydraulic actuators.

To enable the lifting of a load placed on the tailgate, a suitable cable winch 43 is provided and mounted on arm 11, said winch preferably being of the manually operable type and having its cable 45 extending over a pulley 47 which is mounted on the fixed hood portions 35, said cable being becketed at 49 to body 21. Cable winch 43 is of a conventional construction, having an operating lever or arm, a ratchet wheel, and an actuating pawl, to permit winding up of the cable, and also having a releasable holding mechanism for holding the cable drum during winding thereof as the operating arm is oscillated, and being releasable to allow playout of the cable during operation of hydraulic actuators 25 and 33. Upon operation of the cable winch, such as when the parts are disposed in the positions shown in Fig. 6 and a load is placed on the tailgate, it is evident that a considerable load can be lifted. There is a conventional latch mechanism (not shown) for latching the tailgate in closed position.

It may be desirable during some types of dumping operations and the like to place the tailgate in an out-of-the-way position, and this can be readily accomplished because the tailgate in the present invention comprises two sections pivotally connected at 51 and normally held against pivotal movement by a latch bar 53 fitting through bracket 55 fixed to the tailgate sections, see Fig. 3. When latch bar 53 is removed, the tailgate can be swung and folded in a clockise direction to dispose the same under the rear end of body 21. Tailgate 23 has rollers 57, compare Figs. 3 and 4, disposed at pivot 51 to permit the tailgate to be swung in a counter-clockwise direction at the beginning of a raising operation of body 21 so that during the remainder of the elevating operation, rollers 57 will roll along the ground and guide the tailgate forwardly.

By the present invention, a novel trailer-type vehicle has been provided in which the body thereof projects rearwardly of the vehicle wheels a considerable distance to provide a large capacity unit, yet in which the parts are so constructed and connected to one another that the body can be placed in an inclined position much more extreme than that allowed by pivoting of the trailer itself. Furthermore, bulky or heavy loads can be readily lifted into the body by placing the same on the tailgate and operating the cable winch.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described comprising a frame having a forward arm and a rear frame, said forward arm and rear frame being pivoted together permitting said forward arm and rear frame to jackknife upwardly, a trailer body pivoted to the rear end of the rear frame, a jack pivotally mounted at its lower end adjacent the forward end of said rear frame and connected at its upper end to the forward portion of said trailer body, an upwardly extending bracket mounted on the forward end of said rear frame, a second jack pivotally mounted at its lower end to the forward arm substantially forward of the pivot point of said forward arm and said rear frame, the upper end of said second jack being secured to said upwardly extending bracket, and spring means for biasing said second jack to its collapsed position.

2. A device of the character described comprising a frame having a forward arm and a rear frame, said forward arm and rear frame being pivoted together permitting said forward arm and rear frame to jackknife upwardly, a trailer body pivoted to the rear end of the rear frame, a jack pivotally mounted at its lower end adjacent the forward end of said rear frame and connected at its upper end to the forward portion of said trailer body, an upwardly extending bracket mounted on the forward end of said rear frame, a second jack pivotally mounted at its lower end to the forward arm substantially forward of the pivot point of said forward arm and said rear frame, the upper end of said second jack being secured to said upwardly extending bracket, spring means for biasing said second jack to its collapsed position, a winch secured to the forward arm, and a cable operably mounted on said winch and secured at its free end to the trailer body.

3. A device of the character described comprising a frame having a forward arm and a rear frame, said forward arm and rear frame being pivoted together permitting said forward arm and rear frame to jackknife upwardly, a trailer body pivoted to the rear end of the rear frame, a jack pivotally mounted at its lower end adjacent the forward end of said rear frame and connected at its upper end to the forward portion of said trailer body, an upwardly extending bracket mounted on the forward end of said rear frame, a second jack pivotally mounted at its lower end to the forward arm substantially forward of the pivot point of said forward arm and said rear frame, the upper end of said second jack being secured to said upwardly extending bracket, spring means for biasing said second jack to its collapsed position, a winch secured to the forward arm, a cable operably mounted on said winch and secured at its free end to the trailer body, a tail gate hingedly attached to the rear end of the trailer body, means for supporting the tail gate in an open approximately horizontal position next to the ground when the trailer frame and body are disposed in their extreme operative position, said tail gate being foldable about a generally medial horizontal axis to enable the same to be placed in an out-of-the-way position under the body when desired.

4. A device of the character described comprising a frame having a forward arm and a rear frame, said forward arm and rear frame being pivoted together permitting said forward arm and rear frame to jackknife upwardly, a trailer body pivoted to the rear end of the rear frame, means pivotally mounted to the forward end of said rear frame and the forward portion of said trailer body for rotating said trailer body about its pivotal point with respect to the rear frame, an upwardly extending bracket mounted on the forward end of said rear frame, a second means pivotally mounted to the forward arm substantially forward of the pivot point of said forward arm and said rear frame and attached to said upwardly extending bracket for effecting relative movement of the forward arm and rear frame about their pivotal point, and means for biasing said second means to its collapsed position.

References Cited in the file of this patent

UNITED STATES PATENTS

| | | |
|---|---|---|
| 1,174,864 | Hillier | Mar. 7, 1916 |
| 1,424,425 | Spencer | Aug. 1, 1922 |
| 2,219,256 | Evangelista | Oct. 22, 1940 |
| 2,628,126 | Black | Feb. 10, 1953 |